(No Model.)
J. J. HIGGINS.
SHUTTER FOR PHOTOGRAPHIC CAMERAS.
No. 364,413. Patented June 7, 1887.
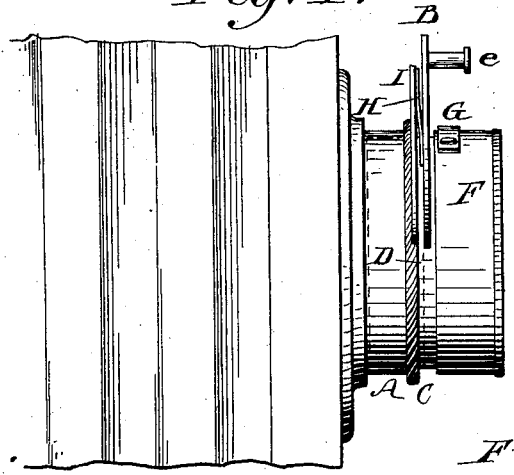
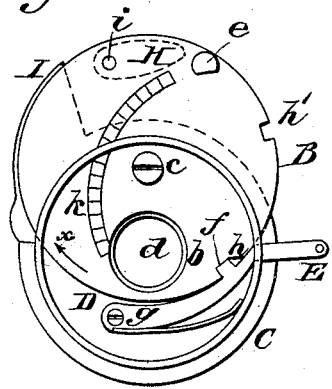
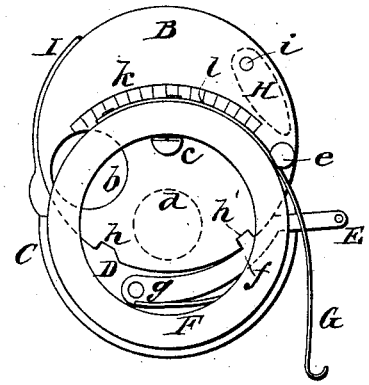
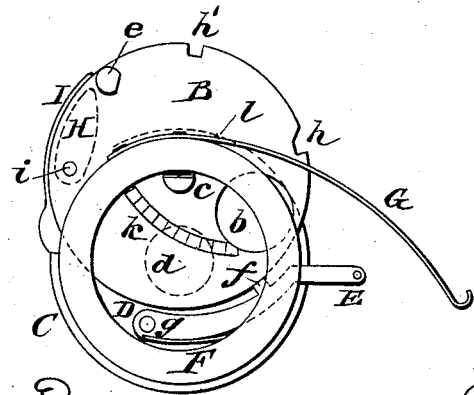
WITNESSES:
John W. Reemer
C. Sedgwick
INVENTOR:
J. J. Higgins
BY Munn & Co.
ATTORNEYS.

UNITED STATES PATENT OFFICE.

JOHN J. HIGGINS, OF NEW YORK, N. Y., ASSIGNOR TO E. & H. T. ANTHONY & CO., OF SAME PLACE.

SHUTTER FOR PHOTOGRAPHIC CAMERAS.

SPECIFICATION forming part of Letters Patent No. 364,413, dated June 7, 1887.

Application filed April 9, 1887. Serial No. 234,230. (No model.)

*To all whom it may concern:*

Be it known that I, JOHN J. HIGGINS, of the city, county, and State of New York, have invented a new and useful Improvement in Shutters for Photographic Cameras, of which the following is a full, clear, and exact description.

This invention relates to that class of shutters for photographic cameras known as "rotary shutters," which are provided with an aperture; and the invention consists in a rotary camera-shutter of novel construction, substantially as hereinafter described, and pointed out in the claims, and which is adapted to take both time and instantaneous pictures.

Reference is to be had to the accompanying drawings, forming a part of this specification, in which similar letters of reference indicate corresponding parts in all the figures.

Figure 1 is an exterior longitudinal view of the front tube of a camera with my invention applied and as adapted to take instantaneous or other pictures, the shutter proper being supposed to work, as in the case of other shutters, in between the lenses of the instrument; but the invention is not restricted to such intermediate position of the shutter relatively to the lenses. Fig. 2 is a front end view of the same with the shutter in position ready to be thrown after focusing, but omitting the front tube of the camera; and Fig. 3, a similar view with the shutter in position after it has been thrown. Fig. 4 is a front view of the shutter as adapted to take time-pictures.

A is the front tube of the camera, on which the shutter, referring to the device as a whole, is arranged and may fit into by screwing or otherwise.

B represents the movable plate of the shutter or shutter proper, having an aperture, $b$, in it eccentric to the axis or pivot $c$, upon or about which it turns.

C is the shutter-tube provided with a transverse plate or diaphragm, D, having an aperture, $d$, which is concentric with the lenses, that may be arranged one on either side and at a suitable distance from the opposite faces of said diaphragm. The pivot $c$ is attached to this diaphragm D, and the movable plate or shutter proper, B, is arranged to work close up and over said diaphragm through a suitable slot or opening in the side of the tube C.

Upon the face of the rotatable plate B is a projection, $e$, which serves both as a handle to manipulate or turn said shutter proper, by and, as will be hereinafter described, as a bearing for a spring used to throw said shutter when taking a picture. Attached, also, or pivoted, as at $g$, to the diaphragm D, is a spring-lever catch, E, which passes out through the side slot in the tube C, and has a tooth, $f$, arranged to press or bear upon the periphery of the shutter proper, B, and to engage as required with one or other of two notches, $h\ h'$, in the peripheral portion of said shutter or movable plate. This lever-catch E is designated to be manipulated either directly by hand or by an attached cord, or by the usual pneumatic operating device used in other shutters. Said lever-catch E may be located in any desired position.

To take a time-picture, reference will mainly be made to Fig. 4, commencing, however, with Fig. 2, which represents the shutter proper, B, as in its closed position before adjusting it for focusing. Said shutter is adjusted from its position shown in Fig. 2 to that represented for it in Fig. 4 by releasing the spring-catch E from the notch $h'$ and turning the shutter by its handle $e$ to the position shown for it in Fig. 4, when the spring-catch E engages with the notch $h$ and holds the shutter in its newly-adjusted position with its aperture B coincident with the exposing-aperture $d$ in the diaphragm D. After focusing, the shutter B is again closed into the position shown in Fig. 2 by simply moving the shutter in direction of the arrow $x$, this movement being facilitated by the beveled shape of the notch $h$. The plate to be photographed is then inserted in the camera. To take the picture, the catch E is released from its engagement in the notch $h'$, and the shutter B is then moved to the position shown in Fig. 4, the catch E again engaging with the notch $h$. After the necessary time-exposure has been made, the shutter B is once more closed, as before, by turning it in direction of the arrow, Fig. 4, until the catch E engages with the notch $h'$.

To take an instantaneous picture, there is fitted over the forward portion of the tube C an outer ring or open-faced cap, F, capable of being turned, but not too freely, or so that it may be held at its adjusted set on or around the tube C. This device F constitutes a holder of the spring used to throw the shutter proper, B. Said spring, which may be a simple strip of steel G, is secured at its one end to or round the cap F, and projects loosely or freely for the greater portion of its length beyond or outside of said cap in the same plane as the latter. This spring G is designed to act under or against the handle $e$ as a bearing to quickly throw the shutter when released. Said spring, however, may be otherwise applied to throw the shutter, subject to a shortening or lengthening of the active portion of the spring to vary its power, substantially as hereinafter described.

The movable apertured plate or shutter proper, B, is first turned by its handle $e$ to focus, as hereinbefore described, and after focusing further turned to bring its aperture $b$ to the left or back of the aperture $d$ in the fixed plate D, as shown in Fig. 2, when the catch E will engage with the notch $h'$ to hold the movable plate B as thus set. In this last adjustment of said plate B its handle $e$ will bear down on the spring G and force it more or less down on and around the outer ring, F, so that when the spring catch E is released, and held released from engaging with either notch $h\ h'$, said spring G, by its tension on the handle or bearing $e$, will fly out or up and rapidly rotate or throw the shutter to give the necessary exposure through the apertures $d\ b$, and to carry the aperture $b$ beyond or to the opposite side of the aperture $d$, as shown in Fig. 3. To prevent jar consequent upon this quick throw of the shutter B by the sudden arrest of it at the end of its stroke, I attach to the end, side, or face of said shutter, as at $i$, a spring, H, which, as the shutter B completes its throw, is brought in contact with and exerts an elastic friction upon, as it passes over, a stationary rubbing surface plate, I, projecting in a plane parallel with the shutter's travel from the fixed ring C, thus giving an easy and gradual stop to the shutter. As it is desirable, however, to vary the speed of the movable shutter B, so as to give a longer or shorter exposure while being thrown by the spring G, the open-faced cap F is turned by hand more or less, as required, upon or around the fixed ring C in either direction, accordingly as it is required to lengthen or diminish the exposure, the setting or turning of the cap F in the one direction—say to the left—giving a greater and longer action of the spring G upon the handle or bearing $e$ to throw the shutter B more rapidly, and the setting or turning of said cap F in the opposite direction giving a lesser or shorter action of the spring G upon the handle or bearing $e$ to throw the shutter less rapidly. To regulate this varied throw of the spring with precision I arrange upon the shutter B a graduated scale, $k$, and provide the spring G, or it might be the cap F, carrying the spring, with an index, $l$, whereby the setting or turning of said cap to give any desired length of exposure may be determined. The scale, instead of being arranged upon the shutter, may be located in any other desired position. Furthermore, the spring G, as hereinbefore observed, may be otherwise applied to lengthen or shorten its active portion, and so to vary its throwing power. Thus it might have a fixed position, or be otherwise attached than described, and the bearing against which it acts to throw the shutter be made variously adjustable, or the throwing-tension of the spring may be otherwise regulated.

Having thus described my invention, what I claim as new, and desire to secure by Letters Patent, is—

1. The circularly-adjustable open-faced cap or ring F and a spring, G, in combination with the apertured rotary shutter B, provided with a handle or bearing, $e$, and the tube C and its apertured diaphragm D, essentially as specified.

2. The spring-catch E, in combination with the apertured rotary shutter B, provided with a handle or bearing, $e$, and notches $h\ h'$, the tube C, with its apertured diaphragm D, and the circularly-adjustable cap F and spring G, substantially as specified.

3. The combination, with the tube C and its diaphragm D, of the rotary apertured shutter B, having a handle or bearing, $e$, and the circularly-adjustable open-faced cap or ring F, with spring G, and a graduated scale, essentially as and for the purposes herein described.

JOHN J. HIGGINS.

Witnesses:
C. SEDGWICK,
E. M. CLARK.